(12) United States Patent
Mimura et al.

(10) Patent No.: US 7,164,900 B2
(45) Date of Patent: Jan. 16, 2007

(54) IMPULSE WAVEFORM GENERATING APPARATUS

(75) Inventors: Masahiro Mimura, Suginami-ku (JP); Suguru Fujita, Ota-ku (JP); Kazuaki Takahashi, Machida (JP)

(73) Assignee: Matsushita Electric Industrial Co., Ltd.

( * ) Notice: Subject to any disclaimer, the term of this patent is extended or adjusted under 35 U.S.C. 154(b) by 446 days.

(21) Appl. No.: 10/841,595

(22) Filed: May 7, 2004

(65) Prior Publication Data

US 2004/0224656 A1 Nov. 11, 2004

(30) Foreign Application Priority Data

May 8, 2003 (JP) .............................. 2003-130137
Apr. 23, 2004 (JP) .............................. 2004-127854

(51) Int. Cl.
*H04B 1/26* (2006.01)

(52) U.S. Cl. ................... 455/318; 455/255; 455/76; 455/260; 455/265; 331/18

(58) Field of Classification Search ............ 455/318, 455/319, 255, 258, 259, 260, 265, 323, 324, 455/76, 261, 262; 331/18, 34, 153
See application file for complete search history.

(56) References Cited

U.S. PATENT DOCUMENTS

| | | | | |
|---|---|---|---|---|
| 3,766,482 A | * | 10/1973 | Brown et al. ................ | 455/265 |
| 5,428,835 A | * | 6/1995 | Okanobu ..................... | 455/34 |
| 5,535,443 A | * | 7/1996 | Wignot ....................... | 455/318 |
| 5,748,046 A | * | 5/1998 | Badger ........................ | 331/18 |
| 5,752,169 A | * | 5/1998 | Hareyama et al. ............ | 455/76 |
| 6,150,891 A | * | 11/2000 | Welland et al. .............. | 455/260 |
| 6,172,579 B1 | * | 1/2001 | Dacus et al. ................. | 455/76 |
| 6,337,976 B1 | * | 1/2002 | Kudou ........................ | 455/258 |
| 6,760,575 B1 | * | 7/2004 | Welland ...................... | 455/319 |
| 2001/0008384 A1 | * | 7/2001 | Ku .............................. | 455/318 |
| 2001/0016476 A1 | * | 8/2001 | Kasahara et al. ............. | 455/262 |
| 2001/0036817 A1 | * | 11/2001 | Yamada et al. .............. | 455/264 |

OTHER PUBLICATIONS

Ultra-Wideband Technology for Short- or Medium-Range Wireless Communications by Jeff Foerster, et al., Intel Technology Journal Q2, 2001.

* cited by examiner

*Primary Examiner*—Lana Le
(74) *Attorney, Agent, or Firm*—RatnerPrestia

(57) ABSTRACT

An impulse waveform generating apparatus comprises an oscillator for generating a reference signal having a center frequency in a frequency band of an impulse to generate, a timing matching circuit for shifting a phase of the reference signal by 90 degrees, a frequency demuultiplier for dividing a frequency of the phase shift signal and obtaining a timing signal having a frequency component having a frequency width of an impulse to generate, a memory storing a waveform shape table, a waveform forming section for forming a waveform in synchronism with the timing signal, according to information of a shape table having a predetermined waveform, a low-pass filter for obtaining an envelope signal from an output signal of the waveform forming section, and a waveform generating section for changing an amplitude of the reference signal according to a value of the envelope signal.

26 Claims, 12 Drawing Sheets

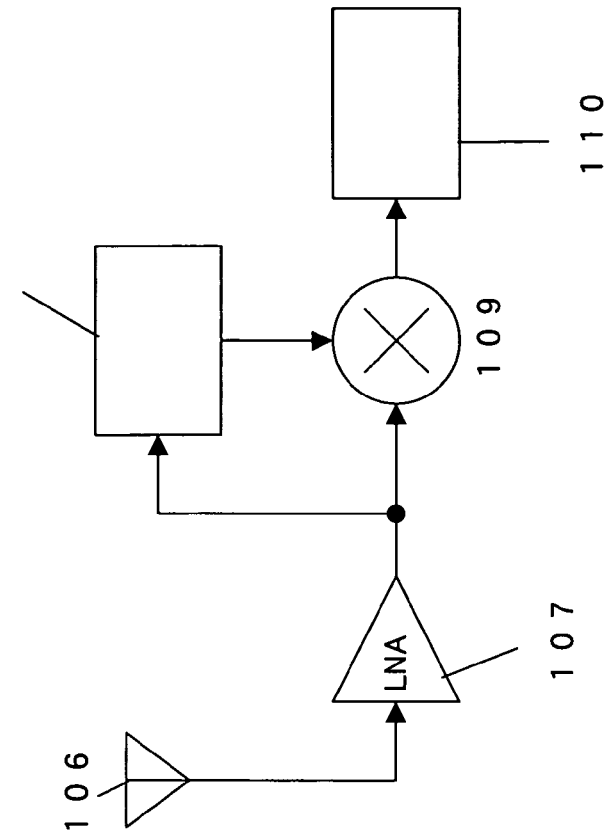
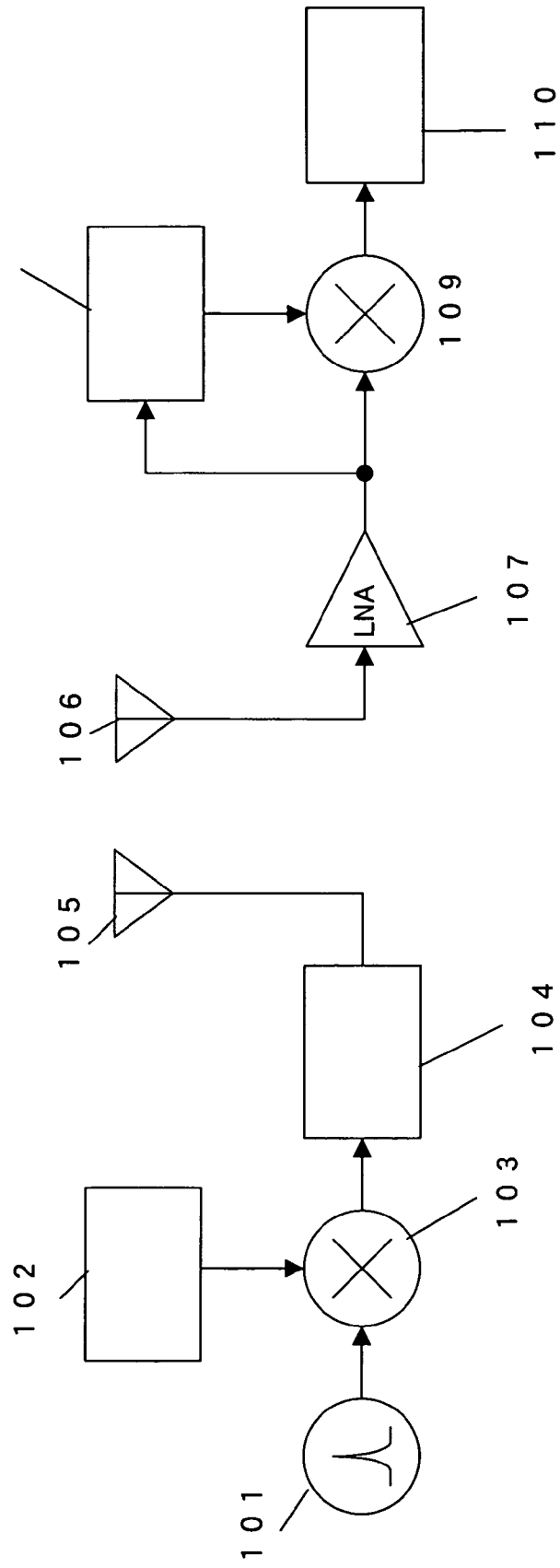

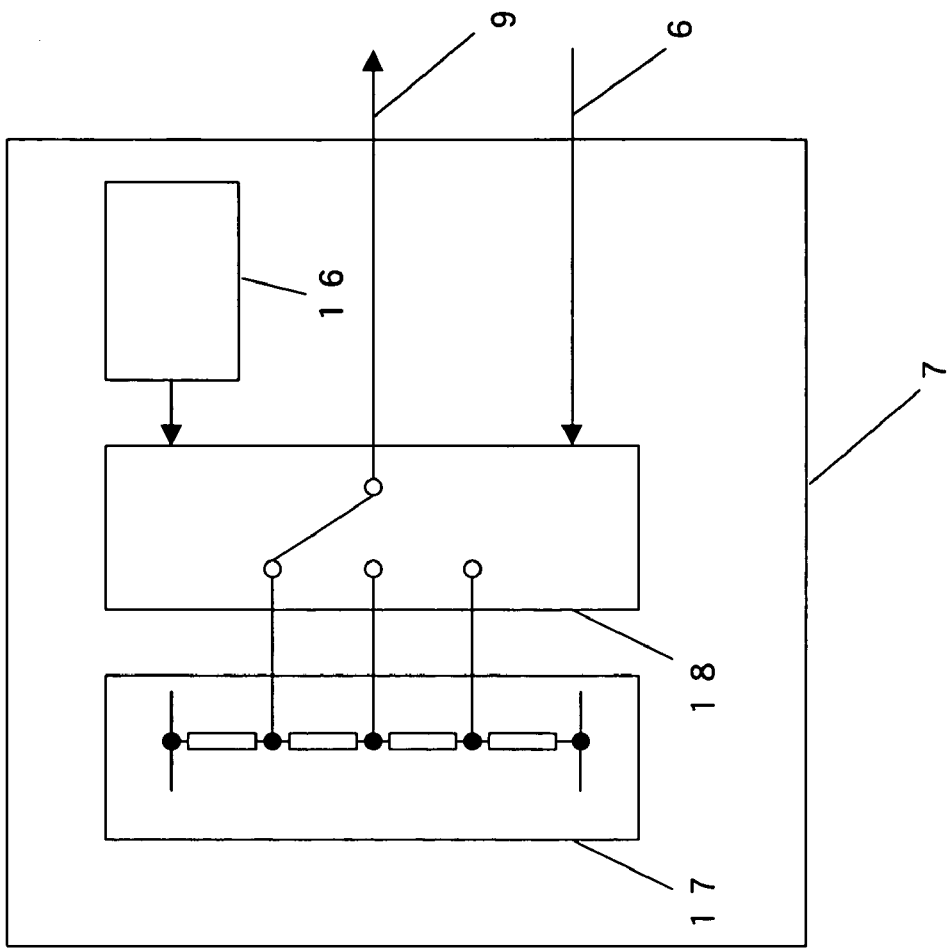
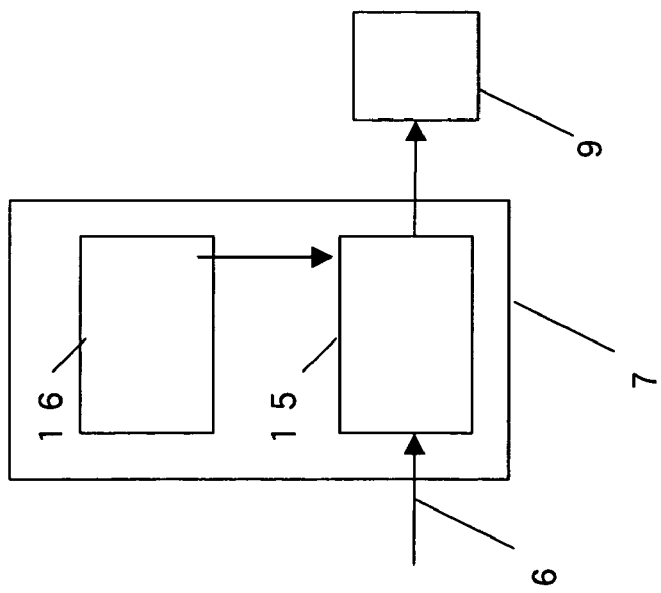

IMPULSE WAVEFORM GENERATING APPARATUS

FIELD OF THE INVENTION

The present invention relates to an impulse waveform generating apparatus applicable to the radio communication apparatus operable on the impulse mainly in the UWB (ultra wide band) or the like.

BACKGROUND OF THE INVENTION

Recently, in the mobile communication field, attentions are drawn to the radio communication technology operable on the impulse in the UWB or the like, as a communication scheme realizing high speed and low power consumption.

FIG. 1A and 1B are block diagrams showing an arrangement of a UWB communication apparatus using the conventional biphase modulation. (See Intel Technology Journal Q2, 2001 "Ultra-wideband Technology for Short- or Medium-Range Wireless Communications".

In the transmitter (FIG. 1A), impulse generating means 101 generates a brief single pulse at a constant interval. The mixer 103 changes the impulse polarity in accordance with the polarity of transmission data 102, thereby effecting biphase modulation. The biphase modulation wave is made into a desired band signal by an impulse shaping filter 104 and then sent out at a transmission antenna 105.

At the receiver (FIG. 1B), the signal received at the reception antenna 106 is amplified up to a desired intensity by an LNA 107. The mixer 109 mixes the reception signal with the version of reception signal passed through delay means 108 for causing a signal delay at the pulse interval given by the transmission means, to effect differential detection thereby detecting a code change between adjacent pulses. The detection result is digital-processed in a data demodulating means 110, to reproduce transmission data.

The UWB scheme thus configured has the following merits.

(1) Low Power Consumption

Because of the scheme not using the carrier wave always requiring continuous output, less power is needed in transmission. This enables to reduce apparatus consumption power.

(2) Small Size and Low Price

Because of no need of analog RF components difficult in CMOS fabrication into an IC, such as VCOs and FR filters, and of not a circuit configuration requiring linearity, CMOS IC fabrication is suitably applicable to facilitate apparatus size and price reduction.

(3) Because of the broad frequency band owing to the communications using high-speed impulses, high-speed data communications are available. In UWB communications using microwave band (3–10 GHz), high-speed data communications are feasible at approximately 100 Mbps.

The circuit schemes shown in FIG. 1A, 1B are suited for IC fabrication. Nevertheless, the impulse shaping filter 104 for restricting the transmission band is an RF-frequency band filter. Usually, it often uses an RF element such as SAW, hence being difficult in IC fabrication.

Accordingly, in order to IC-fabricate the circuit entirety, there is a need to eliminate the impulse shaping filter 104 from the circuit construction. For doing so, it is satisfactory to form a band-limited waveform within the impulse generating means 101.

Generally, in an arbitrary band frequency, the impulse waveform F(t) having an in-band center frequency F0 and band width W is defined by Equation 1.

$$F(t)=[\sin(2\pi Wt)/(\pi t)]\cos(2\pi F0t) \quad \text{Equation 1}$$

Accordingly, for example, with an arrangement that a D/A converter 112 is caused to generate a voltage value in accordance with a waveform table stored in a memory 113 in the timing of a rectangular wave of from a rectangular wave generator 111 thereby generating an impulse waveform F(t) by the D/A converter 112 as shown in FIG. 2, it is possible to configure a circuit not requiring an impulse shaping filter but suited for IC fabrication.

However, this arrangement requires a sampling rate several times the band frequency of the impulse waveform generated by the D/A converter 112. For example, in order to generate an impulse waveform in a band of 3 to 10 GHz, there is a need of a sampling rate at several tens GHz.

In the nowadays device technology, there are no D/A converters operating at such high frequency. Should available in the future, it is considered difficult to reduce consumption current because of high switching frequency. Namely, there is a setback that it is difficult to realize the consumption power reduction, the greatest merit in the UWB.

SUMMARY OF THE INVENTION

Therefore, it is an object of the present invention to realize a circuit arrangement, to be fabricated as an IC, by a scheme suppressing power consumption, thereby realizing a circuit scheme capable of reducing apparatus size and at the same time power consumption.

According to the present invention, an impulse waveform generating apparatus comprises: an oscillator for generating a reference signal having a center frequency F0 in a frequency band of an impulse to generate; a timing matching circuit for shifting a phase of the reference signal by 90 degrees; a frequency demuultiplier circuit for dividing a frequency of the phase shift signal and obtaining a timing signal having a frequency component having a frequency width W of an impulse to generate; a memory storing a waveform shape table; a waveform forming section for forming a waveform in synchronism with the timing signal, according to information of a shape table having a predetermined waveform; a low-pass filter for obtaining an envelope signal from an output signal of the waveform forming section; and a waveform generating section for changing an amplitude of the reference signal according to a value of the envelope signal.

According to the arrangement of the invention, the operation frequency of the D/A converter, which the conventional arrangement requires several times the upper-limit frequency of an impulse waveform transmission band, can be lowered at most to nearly a half, in value, of the width of transmission band. Accordingly, the power consumption on the D/A converter can be reduced. Meanwhile, size and consumption power reduction can be realized on a circuit arrangement suited for digital IC fabrication based on CMOS or the like.

BRIEF DESCRIPTION OF THE DRAWINGS

FIG. 1A and 1B are block diagrams showing an arrangement of a UWB transceiver in the prior art;

FIGS. 4A and 4B are block diagrams showing an arrangement of a waveform forming section of the impulse waveform generating apparatus in an embodiment of the invention;

DESCRIPTION OF THE EXEMPLARY EMBODIMENT

Exemplary embodiments of the present invention are demonstrated hereinafter with reference to the accompanying drawings.

1. First Exemplary Embodiment

Figure 2:
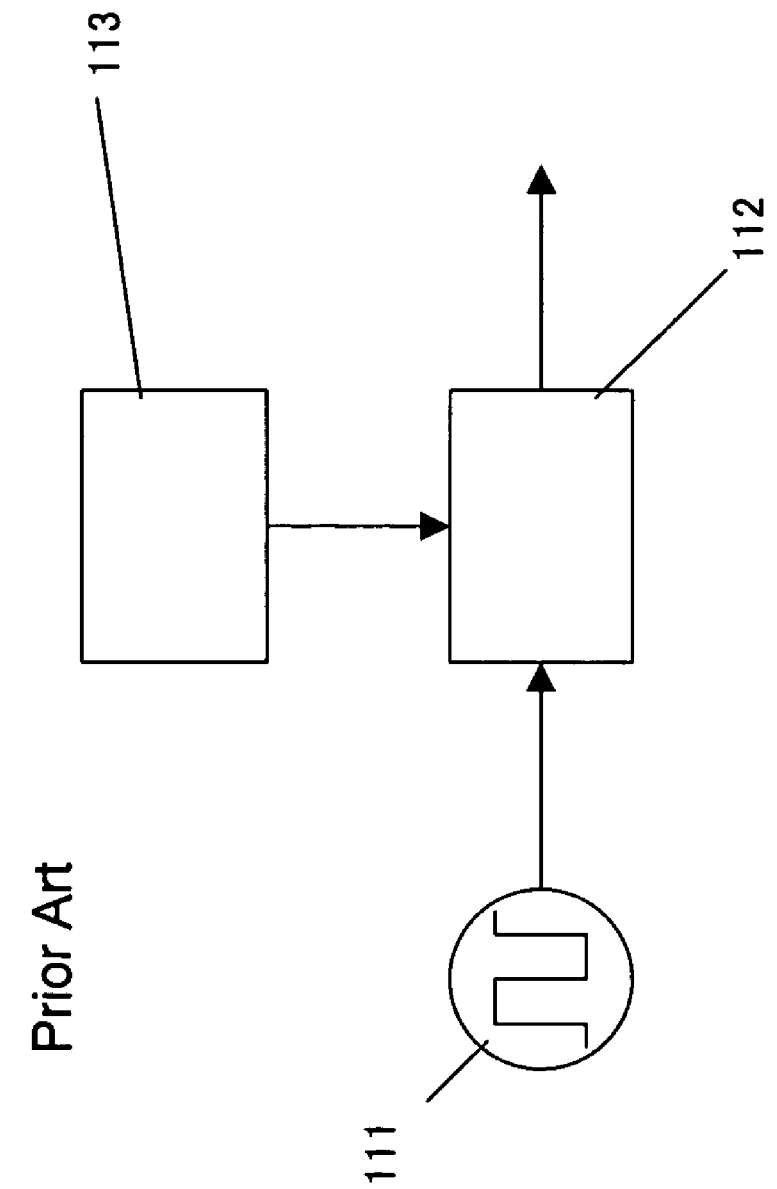
FIG. 2 is a block diagram showing an arrangement of a transmission impulse waveform forming section in the prior art.
Figure 3:
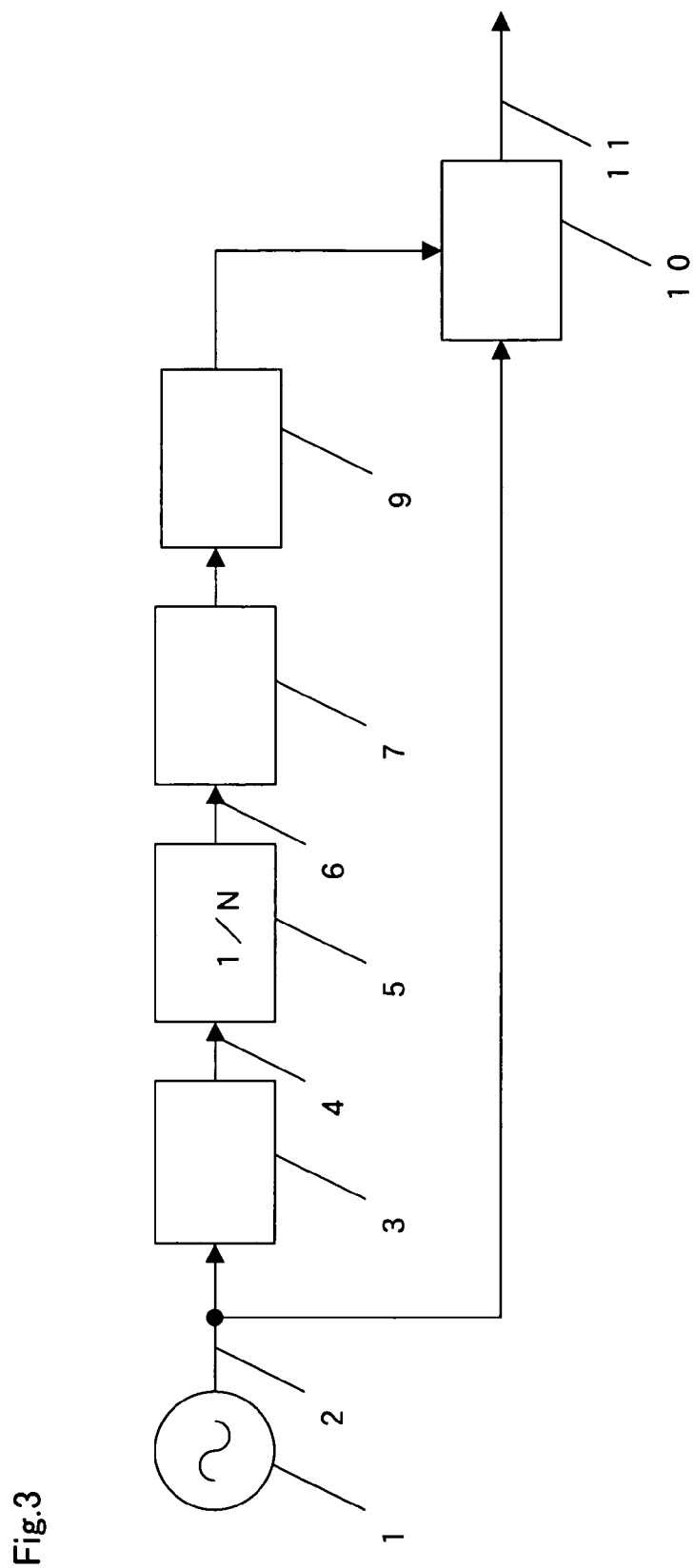
FIG. 3 is a block diagram of an impulse waveform generating apparatus in embodiment 1 of the invention.

FIG. 3 is a block diagram of an impulse-waveform generating apparatus according to embodiment 1 of the present invention. In FIG. 3, an oscillator 1 generates a reference signal 2 having a given amplitude and a center frequency F0 of within a frequency band of an impulse waveform to generate. The reference signal 2 is supplied to a timing matching circuit 3 and waveform forming section 10. The timing matching circuit 3 generates a phase shift signal 4 different in phase by 90 degrees from the reference signal 2, at a frequency F0 and supplies it to a frequency demultiplier circuit 5. The timing matching circuit 3 can use a phase shifter by 90 degrees at frequency F0 or a time delay element having a ¼-wavelength at frequency F0. The frequency demultiplier circuit 5, generally called a frequency divider, makes a 1/N-frequency-division on the phase shift signal 4 and supplies a timing signal 6 having a frequency F0/N to a waveform forming section 7. The waveform forming section 7 is a circuit to be realized in an arrangement shown in FIG. 4A. In timing of the timing signal 6, a D/A converter 15 generates a voltage value conforming to a waveform table to be output, recorded in a memory 16 and supplies it to a low-pass filter 9.

Figure 5:
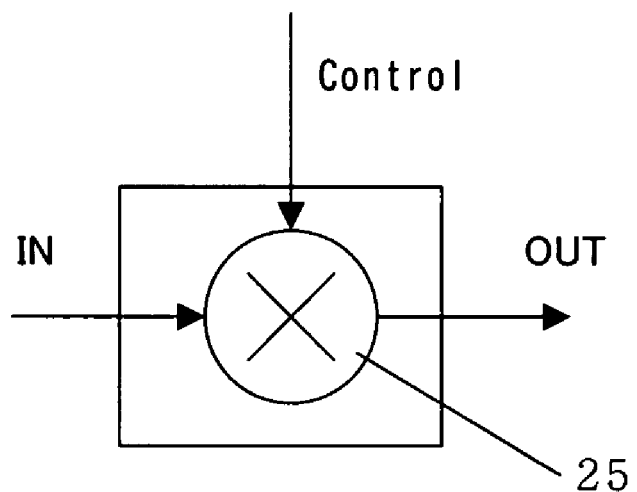
FIGS. 5A and 5B are circuit diagrams showing an arrangement of a waveform forming section of the impulse waveform generating apparatus in an embodiment of the invention.
Figure 5:
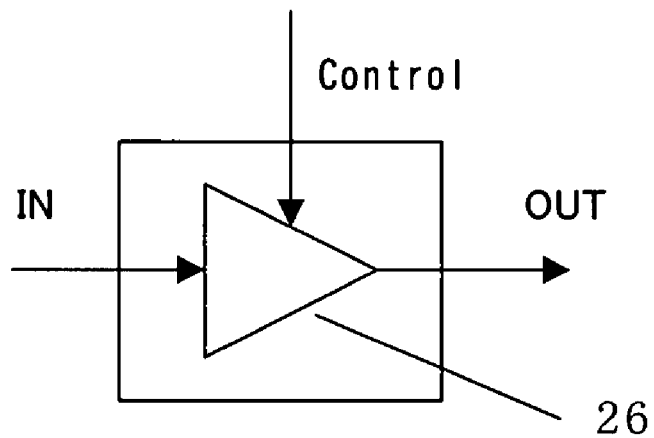

The waveform generating section 10 multiplies an output signal of the low-pass filter 9 by the reference signal 2, to generate an impulse 11 having a center frequency F0 and frequency band F0/N. The waveform generating section 10, although uses a mixer 25 shown in FIG. 5A, may employ a variable gain amplifier 26 as shown in FIG. 5B.

Incidentally, the timing matching circuit 3 is used to put, into an orthogonal relationship, the output signal of the low-pass filter 9 and the phase of the reference signal 2. However, it actually carries out a matching of timing on those while taking into account a signal delay through the frequency demultiplier circuit 5, the waveform forming section 7 and the low-pass filter 9.

Figure 6:
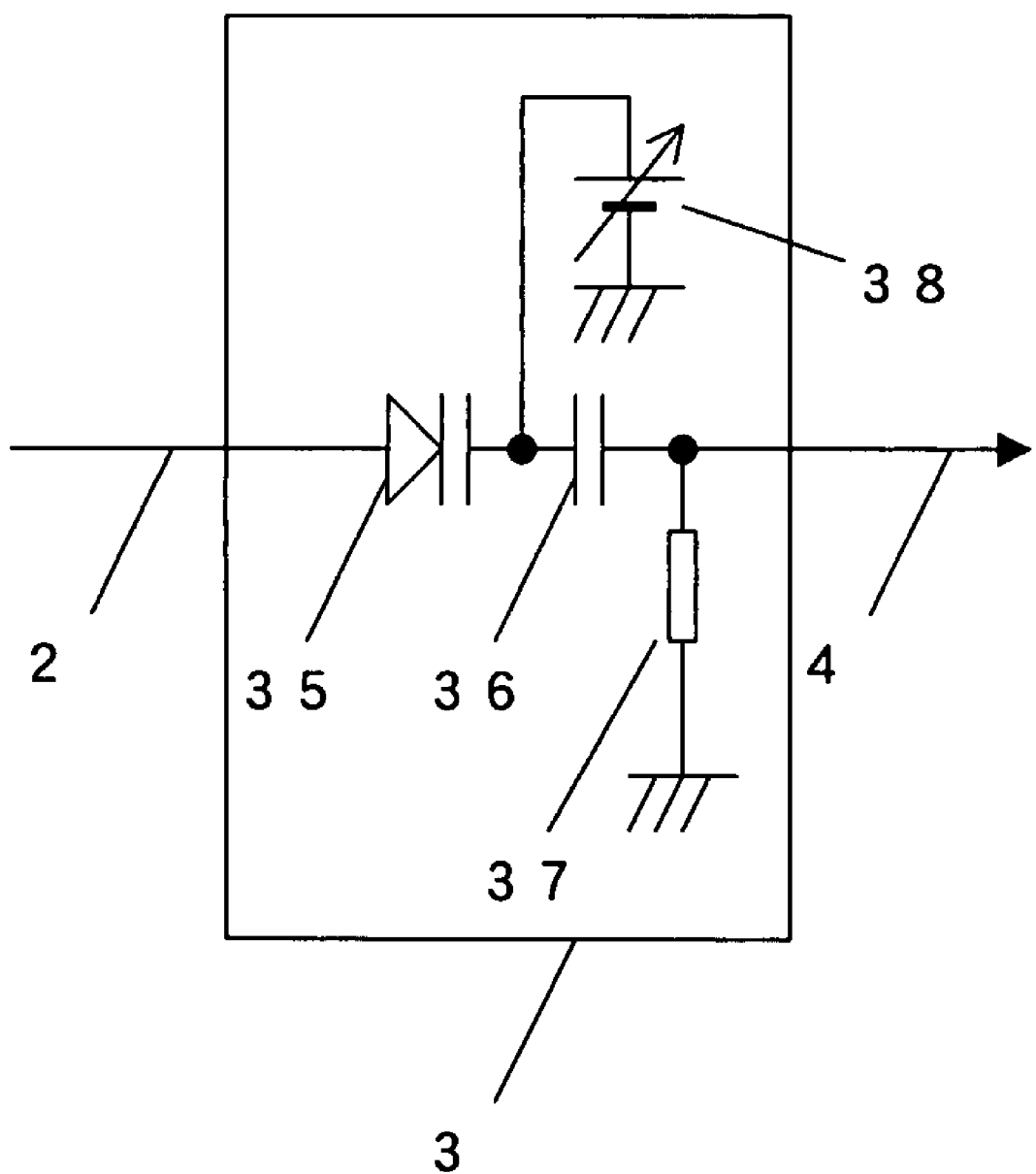
FIG. 6 is a circuit diagram showing an arrangement of a timing matching circuit of the impulse waveform generating apparatus in an embodiment of the invention.

FIG. 6 is a configuration example of the timing matching circuit 3. In FIG. 6, a varactor 35, a capacitance 36 and a resistance 37 constitute a low-pass filter acting as an integration circuit, to delay an input signal. The amount of signal delay can be regulated by the voltage applied by a voltage source 38.

Figure 7A:
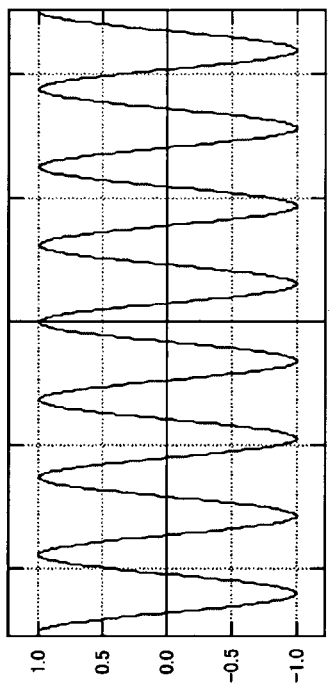
FIGS. 7A–7C are characteristic figures showing an example of impulse waveform generating process for explaining the operation of the impulse waveform generating apparatus in embodiment 1 of the invention.
Figure 7B:
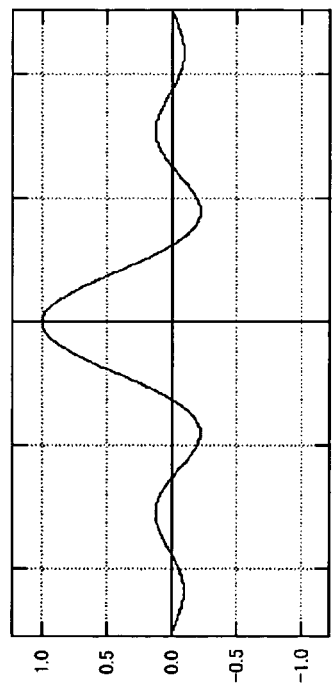
Figure 7C:
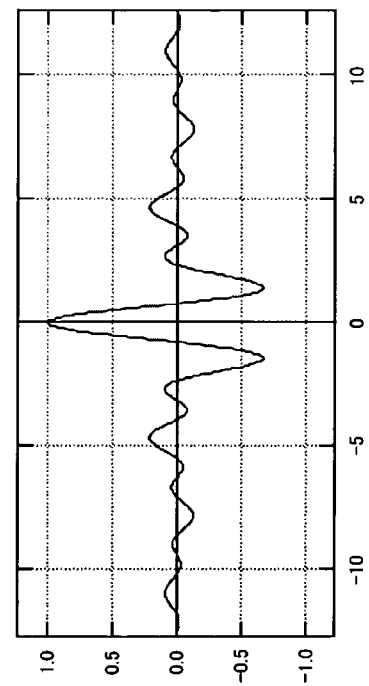

Now, waveform generation is explained in detail by using FIGS. 7A–7C.

As in the foregoing, the impulse waveform F(t) having an in-band center frequency F0 and bandwidth W is defined by aforementioned Equation 1. Namely, where assuming an impulse having a frequency band ranging from a frequency FL to frequency FH as a desired impulse waveform, F(t) may be generated such that the band center frequency F0 and bandwidth W satisfy Equation 2.

$$W=(FH-FL)/2; F0=(FH+FL)/2 \qquad \text{Equation 2}$$

Here, in case the bandwidth W is taken as one-integer-th of the in-band center frequency F0, i.e. W=F0/N (N: integer), the impulse waveform F(t) is expressed by Equation 3. Namely, it can be represented as a multiplication of the (reference signal at frequency F0) in a "cos" term by the (N-frequency-divided signal concerning a signal the reference signal 2 having an amplitude varying in time is phase-shifted 90 degrees at frequency F0) in a term including "sin".

$$F(t)=\cos(2F0\pi t)[\sin(2F0\pi t/N)/(\pi t)] \qquad \text{Equation 3}$$

where t is $-\infty < t < \infty$.

For example, at N=2, F(t) is given a waveform as in FIG. 7C, the sin term is as in FIG. 7B and the cos term is as in FIG. 7A.

The sin term is defined by a crest value so that the waveform forming section 7 can set a crest value. At this time, the higher harmonic components, as caused by approximation of the output signal of the waveform forming section 7 to a rectangular, are removed by the low-pass filter 9. In this case, the low-pass filter 9 is required to have a cutoff frequency of nearly a half of the frequency of a frequency-divided signal 6.

As a result, the reference signal 2 in FIG. 3 is given as a signal approximate to the waveform of FIG. 7A while the output signal of the low-pass filter 9 in FIG. 3 is given as a signal approximate to the waveform of FIG. 7B. Thus, the signal multiplied in the waveform generating section 10 provides a signal approximate to the waveform of FIG. 7C.

With the waveform generation process described in the above, the circuit configuration shown in FIG. 3 is to generate an impulse waveform having a bandwidth W given one-integer-th of the in-band center frequency F0.

Incidentally, the waveform forming section 7 was explained with the configuration shown in FIG. 4A. Alternatively, it may be arranged as shown in FIG. 4B, i.e. a multi-voltage supply section 17 is provided to generate a voltage required for a waveform table so that a switch 18 can select one of the voltages generated by the multi-voltage supply section 17 in the sequence conforming to the information of waveform table stored in the memory 16, to provide it as an output signal from the waveform forming section 10. With this arrangement, the circuit is made smaller in scale than the arrangement using the D/A converter 15 of FIG. 4A, making it possible to reduce consumption power as compared to the arrangement of FIG. 4A.

2. Second Exemplary Embodiment

Figure 8:
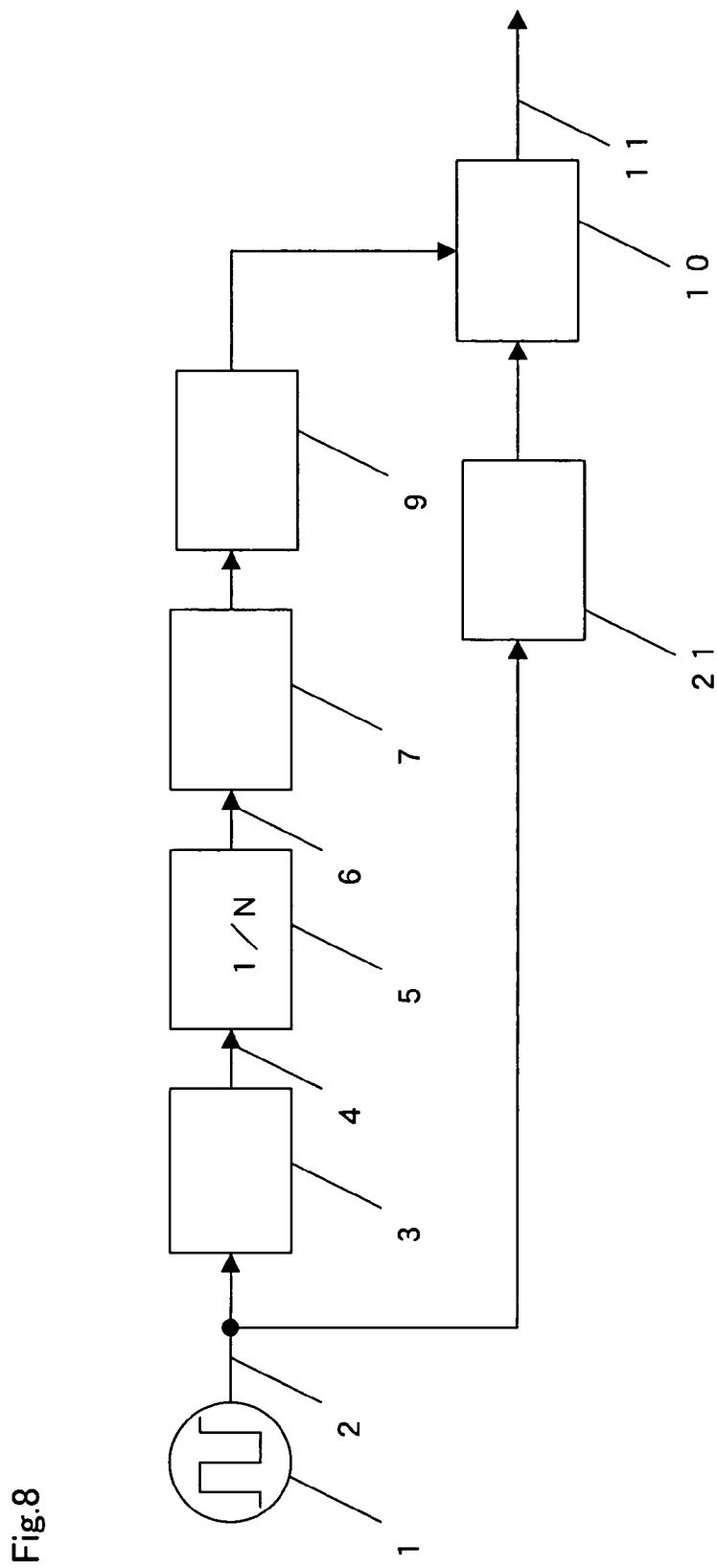
FIG. 8 is a block diagram of an impulse waveform generating apparatus in embodiment 2 of the invention.

FIG. 8 is a block diagram of an impulse waveform generating apparatus according to embodiment 2 of the invention. This embodiment aims at simplifying IC fabrication of the circuit configuration of oscillator 1 by making, as a rectangular wave, the reference signal 2 generated by the oscillator 1 in FIG. 3. The difference of FIG. 8 from FIG. 3 lies in that the oscillator 1 is to supply a rectangular wave and there is provided a second low-pass filter 21 between the oscillator 1 and the waveform generating section 10.

The second low-pass filter 21 has a cutoff frequency set at nearly F0, to obtain a sinusoidal wave having a basic frequency F0. In this embodiment, because the oscillator 1 is not required to generate a sinusoidal wave, the oscillator 1 can be replaced with a clock circuit based on a digital circuit. Meanwhile, the timing matching circuit 3 and the frequency demultiplier circuit 5 can be configured by a digital circuit. The other configurations and operations are similar to those of embodiment 1.

The configuration shown in FIG. 8 can obtain an impulse waveform generating apparatus having an arrangement suited for digital IC fabrication and capable of operating equivalently to FIG. 3.

3. Third Exemplary Embodiment

Figure 9:
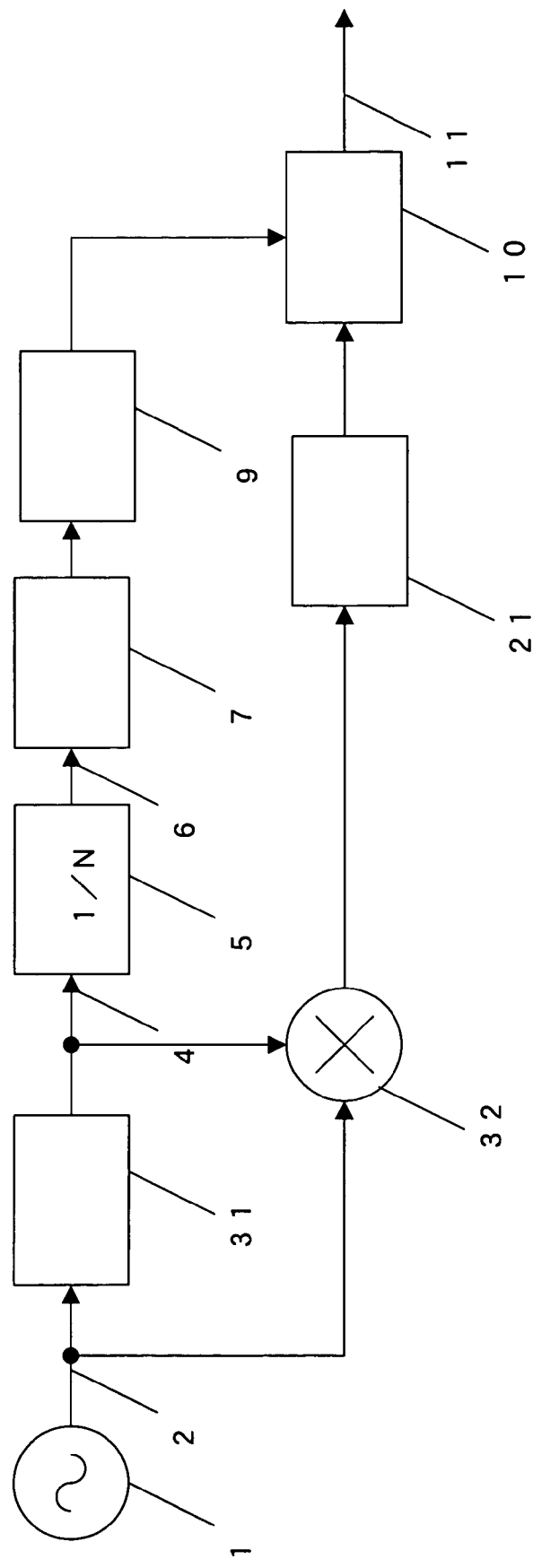
FIG. 9 is a block diagram of an impulse waveform generating apparatus in embodiment 3 of the invention.

FIG. 9 is a block diagram of an impulse waveform generating circuit according to embodiment 3 of the invention. This embodiment aims at obtaining an accurate 90-degree phase shift signal by an easier arrangement than the FIG. 3 configuration. The difference of FIG. 9 from FIG. 3 lies in that the oscillator 1 has a frequency of 2F0 and that a ½-frequency demultiplier circuit 31 and a mixer 32 are provided in place of the timing matching circuit 3 wherein a second low-pass filter 21 is provided further.

In the case the ½-frequency demultiplier circuit 31 frequency-divides the reference signal 2 without causing a delay, the reference signal 2 and the phase shift signal 4 (the term of phase-shift signal is used because the output of the ½-frequency demultiplier circuit 31 is phase-shifted 90 degrees relative to the output signal of the second low-pass filter 21, but the ½-frequency demultiplier circuit 31 itself is not to make a phase-shift operation) as an output signal of the ½ frequency demultiplier circuit 31 are mixed by a mixer 32 into a signal. This signal has a basic signal frequency of F0 and a phase different by 90 degrees from the phase-shift signal 4. Because the output signal of the mixer 32 contains an unwanted frequency component, the unwanted frequency component is removed by the second low-pass filter 21 to thereby extract a desired basic frequency component. The other configurations and operations are similar to those of embodiment 1.

In this arrangement, because the accuracy of 90 degree phase shift is to be determined by the duty ratio of the reference signal 2, it is easy to raise the 90-degree phase shift accuracy as compared to the circuit of FIG. 3.

4. Fourth Exemplary Embodiment

Figure 10:
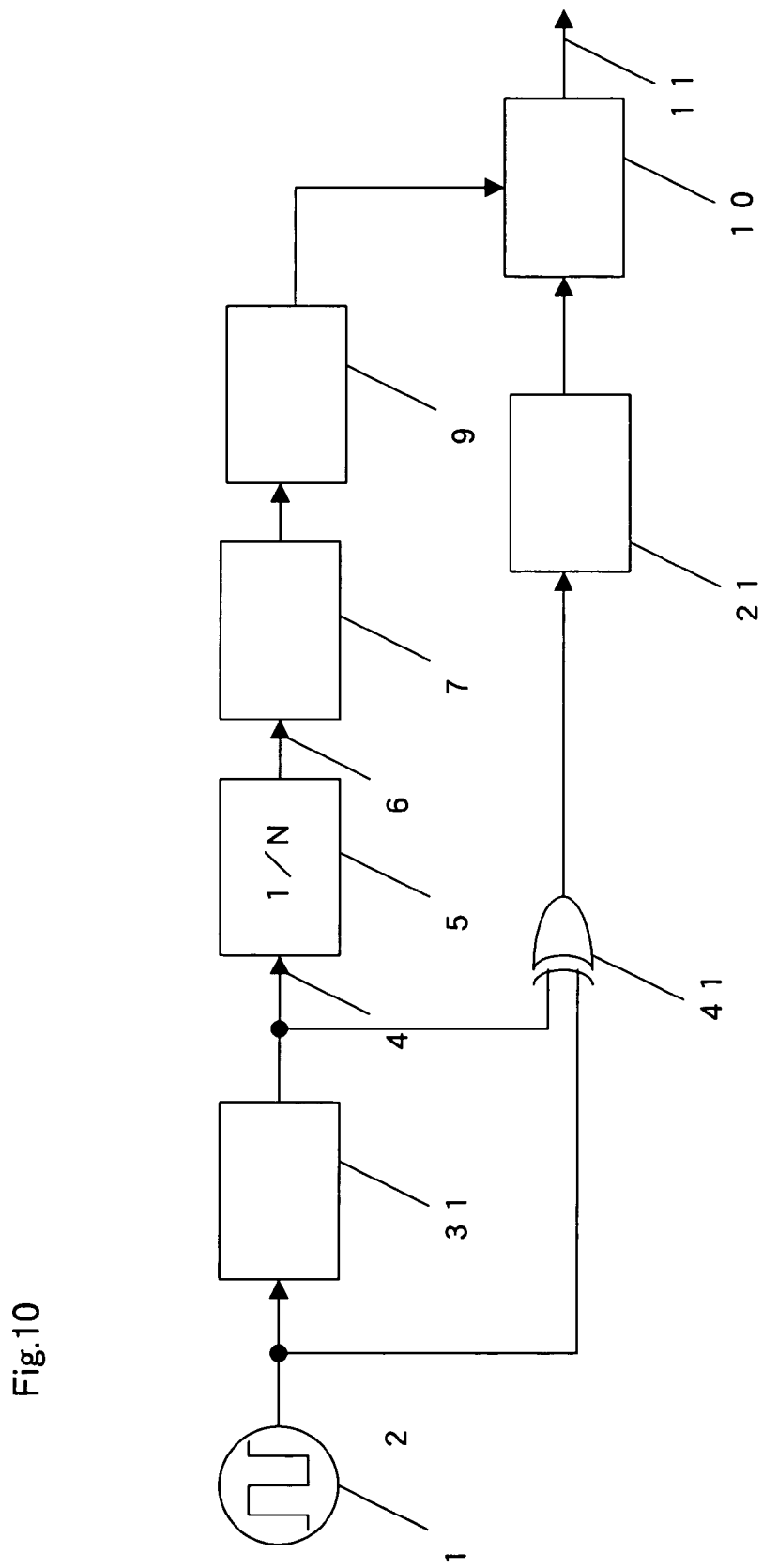
FIG. 10 is a block diagram of an impulse waveform generating apparatus in embodiment 4 of the invention.

FIG. 10 is a block diagram of an impulse waveform generating apparatus according to embodiment 4 of the invention. This embodiment is an arrangement with a digital circuit suited for IC fabrication of the circuit shown in FIG. 9 of embodiment 3. The difference of FIG. 10 from FIG. 9 lies in that the oscillator 1 is provided as a rectangular-wave oscillator for generating a rectangular wave and a multiplying circuit 41 is provided in place of the mixer 32 in order to carry out a multiplying operation based on a binary value of an exclusive OR circuit or the like. The other configurations and operations are similar to those of embodiment 3.

According to this embodiment, the oscillator 1 is not required to generate a sinusoidal wave and hence can be replaced with a clock circuit based on a digital circuit not requiring linearity. Due to this, it is possible to obtain an impulse waveform generating apparatus having an arrangement suited for digital IC fabrication and capable of operating equivalently to the arrangement of FIG. 9.

5. Fifth Exemplary Embodiment

Embodiment 5 is arranged so that the oscillation frequency of the oscillator 1 of embodiments 1–4 can be changed by an external signal, thereby relaxing the interference condition with other narrow band communication systems.

The impulse waveform to be generated in embodiments 1–4 has a frequency component in a comb form. Consequently, the transmission signal has a frequency band distributing over a wide band. However, discrete frequency components exist as frequency spectrum, the interval of which is broader than the band frequency in the conventional narrow band communications. For this reason, noticing the point that impulse frequency component be determined based on F0, the frequency F0 is finely changed based on an oscillation frequency control signal externally supplied, to thereby shift the frequency spectrum to a frequency where no narrow-band communications exist therearound. This can reduce the interference of one narrow band system to and from another.

6. Sixth Exemplary Embodiment

Embodiment 6 is arranged so that the oscillation frequency of the oscillator 1 of embodiments 1–4 can vary at all times, thereby relaxing the interference condition with other narrow band communication systems.

The impulse on embodiments 1–4 is of a broadband signal and hence has a frequency error permissibility in transmission and reception greater, in absolute value, as compared to that of narrowband communications. Namely, frequency variation if slight less have an effect upon the waveform. For this reason, with an arrangement the oscillation frequency F0 is varied at all times by an external signal, it is possible to make temporary the affection of the interference of one narrow band system to and from another.

According to the arrangement of this embodiment, in case the affection of interference can be made as temporary one, the characteristic deterioration due to interference can be relaxed by suitably applying an error correction technique.

7. Seventh Exemplary Embodiment

Figure 11:
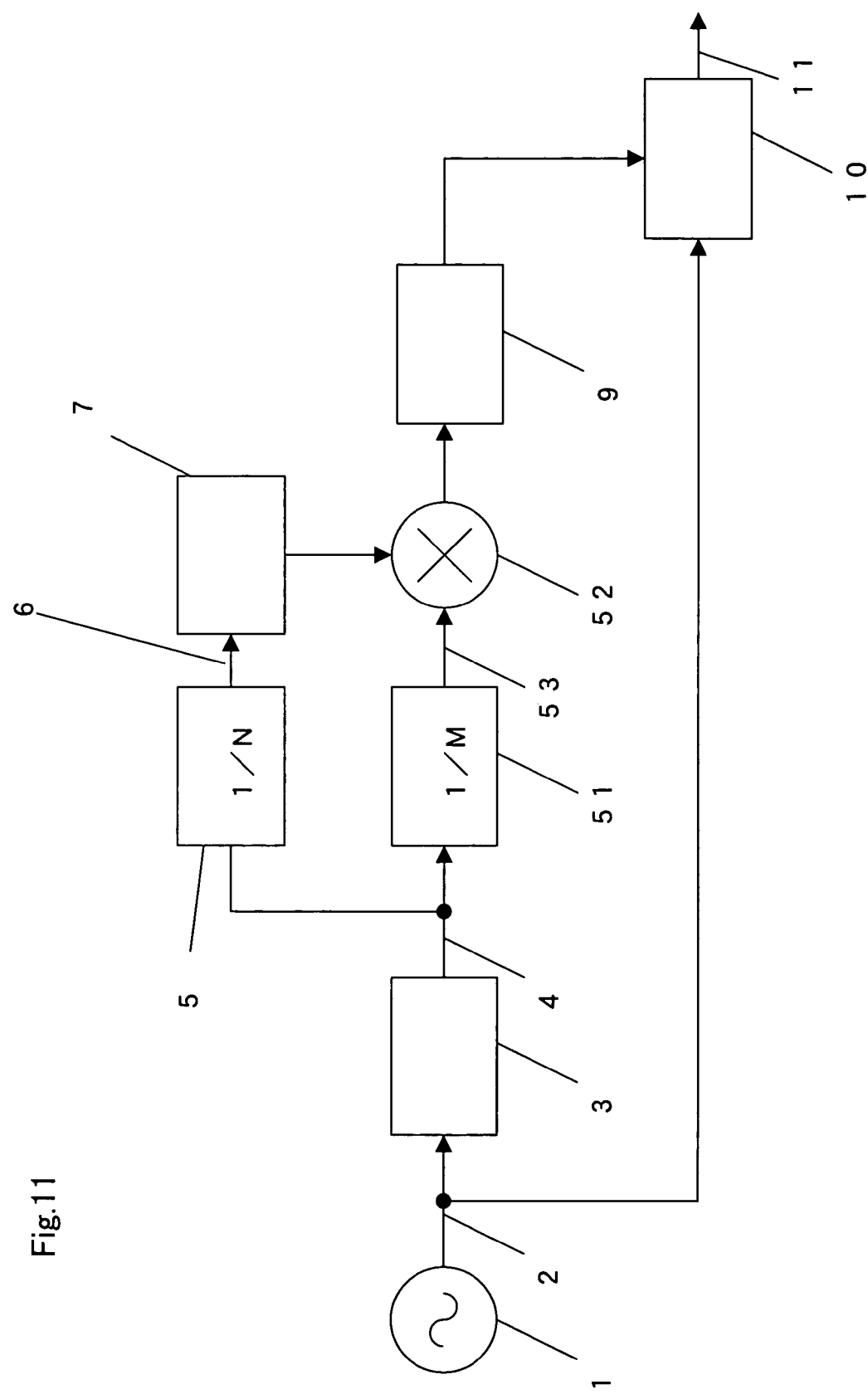
FIG. 11 is a block diagram of an impulse waveform generating apparatus in embodiment 7 of the invention.

FIG. 11 is a block diagram of an impulse waveform generating apparatus according to embodiment 7 of the invention. This embodiment aims at further reducing the D/A converter operating frequency in the waveform forming section 7 of FIG. 3 arrangement. The difference of FIG. 11 from FIG. 3 lies in the provision of a second frequency demultiplier circuit 51 so that a mixer 52 can mix an output 53 of the second frequency demultiplier circuit 51 with an output of the waveform forming section 7.

The second frequency demultiplier circuit 51 1/M-frequency-divides and supplies to the mixer 52 a phase-shift signal 4 as an output of a timing matching circuit 3. Meanwhile, a first frequency demultiplier circuit 5 1/N-frequency-divides a phase-shift signal 4 as an output of a timing matching circuit 3, and supplies a timing signal 6 having a frequency F0/N to the waveform forming section 7.

The outputs of the waveform forming section 7 and the output of the second frequency demultiplier circuit 51 are mixed together by the mixer 52, and supplied to a low-pass filter 9. The other configurations and operations are similar to those of embodiment 1.

This embodiment can further reduce the D/A converter operating frequency in the waveform forming section 7.

8. Eighth Exemplary Embodiment

Figure 12:
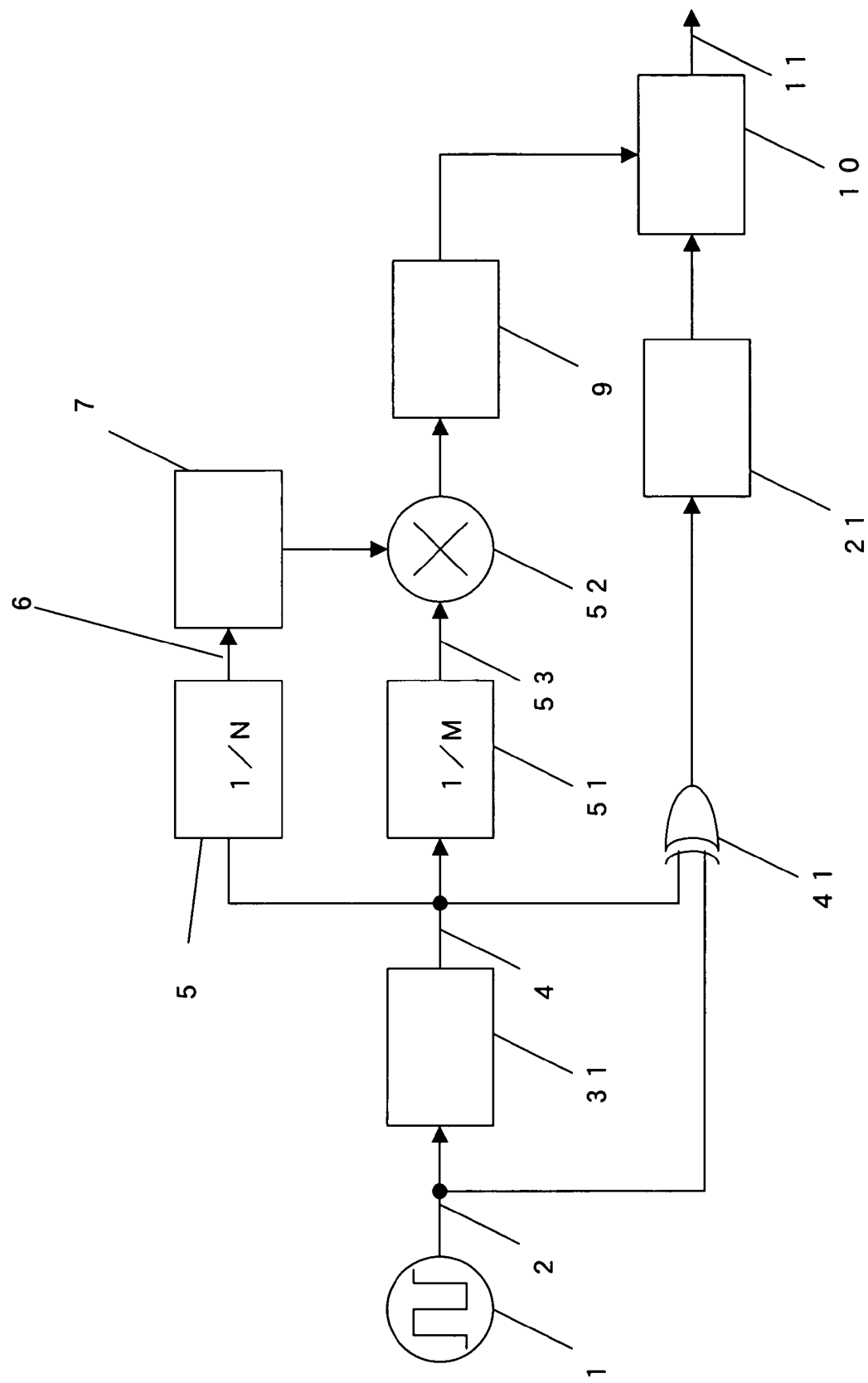
FIG. 12 is a block diagram of an impulse waveform generating apparatus in embodiment 8 of the invention.

FIG. 12 is a block diagram of an impulse waveform generating apparatus according to embodiment 8 of the invention. This embodiment aims at further reducing the D/A converter operating frequency in the waveform forming section 7 of the FIG. 10 arrangement. The difference of FIG. 12 from FIG. 10 lies in the provision of a second frequency demultiplier circuit 51 so that a mixer 52 can mix an output 53 of the second frequency demultiplier circuit 51 with an output of the waveform forming section 7.

The second frequency demultiplier circuit 52 1/M-frequency-divides a phase shift signal 4 as an output of a ½ frequency demultiplier circuit 31. Meanwhile, the first frequency demultiplier circuit 5 1/N-frequency-divides the phase shift signal 4 as an output of the ½ frequency demultiplier circuit 31 and supplies a timing signal 6 having a frequency F0/N to the waveform forming section 7. The output of the waveform forming section 7 and the output 53 of the second frequency demultiplier circuit 51 are mixed together in the mixer 52, and supplied to the low-pass filter 9. The other configurations and operations are similar to those of embodiment 4.

In this embodiment, because the D/A converter operating frequency can be further reduced in the waveform forming section 7 and the oscillator 1 can be configured by a clock circuit based on a digital circuit not requiring linearity, the arrangement can be made suitable for digital IC fabrication.

In the waveform forming section 7 of the embodiments 1–8 so far explained, by preparing a plurality of waveform tables for storage in the memory 16 to thereby suitably change the waveform table for use, it is possible to make variable the transmission frequency band of an impulse to generate. This makes it possible to properly select and apply an impulse waveform in a broadband when communication capacity is required, and in a narrowed band when communications are necessarily to a broad area. Thus, total communication quality improvement is to be realized.

Meanwhile, although embodiments 1–8 explained that the oscillator 1 generates signals constant in amplitude at all times for simplifying explanation, signals must not be continuously generated. The oscillator 1 may use, for example, an intermittent oscillator for generating a signal only upon generating an impulse signal, e.g. such a configuration as an oscillator utilizing a tank circuit. However, in this case, there predictably encounters variation in the oscillation signal amplitude in a rise at an oscillation start-up of the oscillator 1 or in a fall at an oscillation halt. By previously adding the amplitude correction values for rise or fall to the waveform tables in the memory 16, stable operation is made available. In this manner, the arrangement for intermittently generating oscillation signals can further reduce consumption power as compared to the arrangement generating signals al all times.

What is claimed is:

1. An impulse waveform generating apparatus comprising:
    an oscillator for generating a reference signal having a center frequency in a frequency band of an impulse to generate;
    a timing matching circuit for generating a phase shift signal by phase-shifting the reference signal with 90 degrees;
    a frequency demultiplier circuit for dividing a frequency of the phase shift signal and obtaining a timing signal having a frequency component corresponding to a frequency width of the impulse to generate;
    a waveform forming section for forming a waveform in synchronism with the timing signal, according to information of a shape table having a predetermined waveform;
    a low-pass filter for removing an unwanted higher harmonic component from an output signal of the waveform forming section and generating an envelope signal; and
    a waveform generating section for changing an amplitude of the reference signal correspondingly to a value of the envelope signal.

2. An impulse waveform generating apparatus according to claim 1, wherein the reference signal is a sinusoidal wave signal.

3. An impulse waveform generating apparatus according to claim 1, wherein said oscillator generates a rectangular wave signal, and further comprising a second low-pass filter for obtaining a reference signal having a center frequency in a frequency band of an impulse to generate, by filtering a basic frequency component of the rectangular wave signal.

4. An impulse waveform generating apparatus according to claim 1, further comprising a second frequency demultiplier circuit for dividing a frequency of the phase shift signal, and a mixer for mixing together an output of the waveform forming section and an output of the second frequency demultiplier circuit, wherein the low-pass filter removes an unwanted higher harmonic component from an output signal of the mixer and generates an envelope signal.

5. An impulse waveform generating apparatus according to claim 1, wherein the timing matching circuit is a 90-degree phase shifter at frequency F0.

6. An impulse waveform generating apparatus according to claim 1, wherein the timing matching circuit is a time delay element in an amount of ¼-wavelength at frequency F0.

7. An impulse waveform generating apparatus according to claim 1, wherein the waveform forming section is one selected from a group of a mixer circuit and a variable gain amplifier.

8. An impulse waveform generating apparatus according to claim 1, wherein the waveform forming section is configured having a memory for storing a waveform shape table and a D/A converter for forming a waveform in synchronism with the timing signal according to information of the waveform shape table.

9. An impulse waveform generating apparatus according to claim 1, wherein the waveform forming section is configured having multi-voltage supplying circuit for generating all voltage values to output, and switch means for selecting a voltage generated by the multi-voltage supplying circuit in order conforming to information of the waveform shape table.

10. An impulse waveform generating apparatus according to claim 1, wherein a plurality of the waveform shape table are prepared, to switch the waveform shape table to be supplied to the waveform forming section in accordance with a transmission band.

11. An impulse waveform generating apparatus according to claim 1, wherein the oscillator is configured to change an oscillation frequency according to an oscillation frequency control signal supplied from an external.

12. An impulse waveform generating apparatus according to claim 1, wherein the oscillator is to generate a signal only when generating an impulse waveform.

13. An impulse waveform generating apparatus according to claim 1, wherein the timing matching circuit is configured having a delay circuit, adjustable of delay time, made up by a resistance, a capacitor and a varactor.

14. An impulse waveform generating apparatus comprising:
- an oscillator for generating a signal having a frequency double a center frequency in a frequency band of an impulse to generate;
- a ½-frequency demultiplier circuit for ½-dividing a frequency of an output signal of the oscillator and obtaining a reference signal having the center frequency;
- a frequency demultiplier circuit for 1/N-dividing the reference signal and obtaining a timing signal having a frequency component corresponding to a frequency width of an impulse to generate;
- a waveform forming section for forming a waveform in synchronism with the timing signal, according to information of a shape table having a predetermined waveform;
- a first low-pass filter for removing an unwanted higher harmonic component from an output signal of the waveform forming section and obtaining an envelope signal; and
- a multiplier for multiplying the reference signal by an output signal of the oscillator and obtaining a signal containing a signal component different in phase by 90 degrees from the reference signal;
- a second low-pass filter for filtering a component of frequency F0 from an output signal of the multiplier and obtaining a phase shift signal different in phase by 90 degrees from the reference signal; and
- a waveform generating section for changing an amplitude of the phase shift signal according to a value of the envelope signal.

15. An impulse waveform generating apparatus according to claim 14, wherein the multiplier is a mixer.

16. An impulse waveform generating apparatus according to claim 14, wherein said oscillator generates a rectangular wave signal, and the multiplier is an exclusive OR circuit for multiplication operation based on a binary value.

17. An impulse waveform generating apparatus according to claim 16, further comprising a second frequency demultiplier circuit for 1/M-dividing a frequency of an output signal of the rectangular wave generating means, and a mixer for mixing an output of the waveform forming section with an output of the second frequency demultiplier circuit, wherein the first low-pass filter removes an unwanted higher harmonic component from an output signal of the mixer to generate an envelope signal.

18. An impulse waveform generating apparatus according to claim 14, wherein the timing matching circuit is a 90-degree phase shifter at frequency F0.

19. An impulse waveform generating apparatus according to claim 14, wherein the timing matching circuit is a time delay element in an amount of ¼-wavelength at frequency F0.

20. An impulse waveform generating apparatus according to claim 14, wherein the waveform forming section is one selected from a group of a mixer circuit and a variable gain amplifier.

21. An impulse waveform generating apparatus according to claim 14, wherein the waveform forming section is configured having a memory for storing a waveform shape table and a D/A converter for forming a waveform in synchronism with the timing signal according to information of the waveform shape table.

22. An impulse waveform generating apparatus according to claim 14, wherein the waveform forming section is configured having multi-voltage supplying circuit for generating all voltage values to output, and switch means for selecting a voltage generated by the multi-voltage supplying circuit in order conforming to information of the waveform shape table.

23. An impulse waveform generating apparatus according to claim 14, wherein a plurality of the waveform shape table are prepared, to switch the waveform shape table to be supplied to the waveform forming section in accordance with a transmission band.

24. An impulse waveform generating apparatus according to claim 14, wherein the oscillator is configured to change an oscillation frequency according to an oscillation frequency control signal supplied from an external.

25. An impulse waveform generating apparatus according to claim 14, wherein the oscillator is to generate a signal only when generating an impulse waveform.

26. An impulse waveform generating apparatus according to claim 14, wherein the timing matching circuit is configured having a delay circuit, adjustable of delay time, made up by a resistance, a capacitor and a varactor.

* * * * *